Patented Oct. 18, 1932

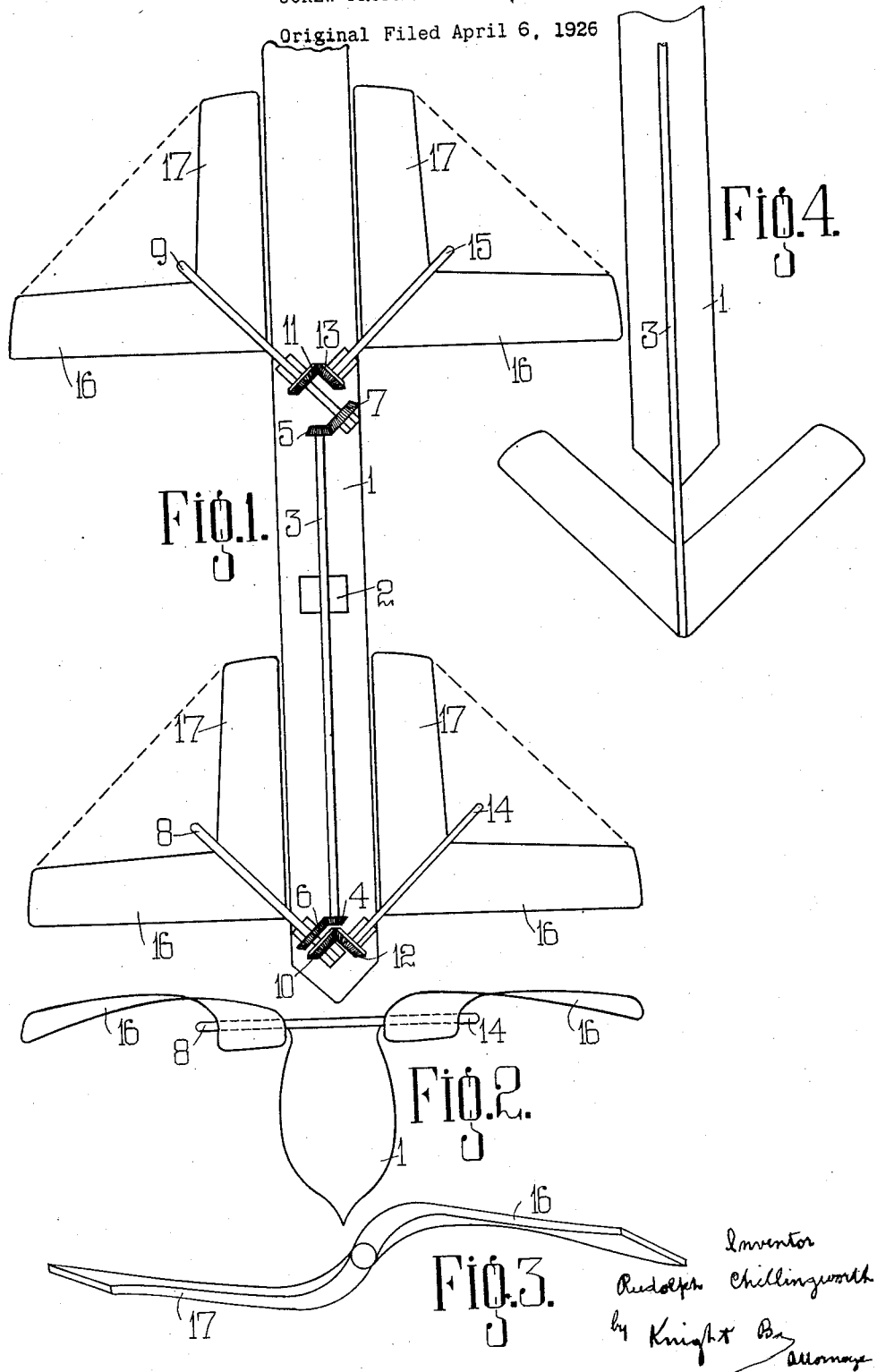

1,883,336

UNITED STATES PATENT OFFICE

RUDOLPH CHILLINGWORTH, OF LEYTONSTONE, ENGLAND

SCREW PROPELLER FOR AIRCRAFT

Application filed April 6, 1926, Serial No. 100,100, and in Great Britain February 12, 1925. Renewed December 18, 1931.

This invention relates to improvements in aircraft and propellers therefor, which latter are of the type in which the blades describe the surface of a cone of substantially 90° angle in their rotation.

A propeller for ships is known in which the blades describe a conical surface, a pair of such propellers being arranged on shafts inclined at 45° to the longitudinal axis of the ship.

In the propeller of the present invention a pair of blades lie substantially in the plane of the driving shaft, and they have their bounding edges, when viewed in plan, and their inner bounding edges when viewed in plan substantially at right angles to one another, and at 45° to the said driving shaft.

The invention is shown diagrammatically in one of its forms of construction in the drawing, which shows respectively:—

Figure 1—an aeroplane, with two pairs of propellers fixed one behind the other, in plan view.

Figure 2—an end elevation of the aeroplane shown in Fig. 1.

Figure 3—the view of a propeller in the plane of the blades.

Figure 4—an aeroplane with a front propeller.

The aeroplane fuselage 1 is constructed in any suitable form and manner, and contains a longitudinal shaft 3, rotated directly by the driving motor 2, which shaft carries bevel wheels 4 and 5 one each on the forward and rear end. Each of the bevel wheels 4 and 5 acts respectively on shafts 8 and 9 in a horizontal plane with respect to the longitudinal axis of the aeroplane and arranged at 45° to the rear and mounted in the body of the aeroplane. Each of these shafts 8, 9 bears a second bevel wheel, 10 and 11 respectively, which engages with a bevel wheel, 12 and 13 on a second shaft 14 and 15 extending rearwards from the other side of the fuselage at the same angle and in the same plane.

The fuselage is thus fitted with four shafts 8, 9 and 14, 15 driven from the same source of power, extending to the rear at an angle of 45° in the horizontal plane relative to the longitudinal axis of the fuselage. On each of these shafts a propeller is fitted, which consists of two blades 16 and 17 at right angles to one another and which are so fitted with respect to the driving shaft that this bisects the right angle between the two blades.

The propeller blades are thus at an angle of 45° to the driving shaft. In the selected form of construction, the shafts are driven and the blades are fixed on the shaft. The blades can however also be arranged to be rotatable on their shafts or axes and in this case the blades are driven and the axis is stationary. The axis of rotation of the propeller can also be inclined at an angle of about 45° to the longitudinal axis of the craft and bear the blades on this inclined end.

Each propeller can be provided with a single blade, which is also at an angle of 45° to its axis of rotation, instead of two blades.

The propellers may be arranged singly or in pairs on each side of the fuselage, and their number is unlimited. It is also possible to arrange a plurality of propeller blades, of the kind described, one behind the other on a single shaft.

It is possible to arrange the propellers not only in the front as shown in Fig. 3 for example, or at the rear of the aeroplane, but they can also be fitted at the side of the fuselage and in very close proximity thereto.

The axes of rotation of the propellers need not be inclined relative to the fuselage, but can each assume any suitable position with respect thereto. The blades can be made resilient or yielding at their ends by means of slits or other devices, so as to attain a greater efficiency.

The new type of propeller can be used for aeroplanes, airships, and the like, of various kinds. A plurality of supporting bodies with suitably arranged propellers can be connected in one system, or these propellers could be fitted on horizontal or vertical rotatable supporting bodies or axles.

The construction of the blades thus unites the action of the supporting planes with the previous usual propellers and renders possible simultaneous vertical and horizontal steering.

From an examination of the drawing it will be seen that each blade of the improved propeller is curved upwards from the boss out of its median plane, and then downwards at the tip towards the median plane.

Further each blade is slightly twisted about its own axis from boss to tip.

I declare that what I claim is:—

1. A propeller device having a shaft, a blade on the shaft, disposed obliquely with respect thereto, the inner portion of the blade being parallel with the longitudinal line of the shaft and being applied on an oblique line in the direction of the transverse plane of the blade, the blade in the direction of its longitudinal axis being curved, the curving of the blade being away from its longitudinal axis from the inner end portion towards the middle portion and reversely from the middle portion towards the tip portion, and the blade also being curved spirally about its longitudinal axis from the inner end portion to the tip portion.

2. A propeller blade having a shaft at an angle to the longitudinal line of the support for the shaft, a blade on the shaft, disposed at such an angle with respect thereto that the blade will carry through a position at one point substantially parallel to the longitudinal line of the support and through a position at an opposite point substantially at right angles thereto, the blade in the direction of its longitudinal axis being curved and the curving of the blade being away from its longitudinal axis from the inner end portion towards the middle portion and reversely from the middle portion towards the tip portion, and the blade also being curved spirally about its longitudinal axis from the inner end portion to the tip portion.

3. A propeller blade having a shaft at an angle to the longitudinal line of the support for the shaft, a blade the inner end portion of which is parallel with the longitudinal line of the shaft and which is applied on an oblique line in the direction of the transverse plane of the blade, the blade being disposed on the shaft at such an angle that the blade will carry through a position at one point substantially parallel to the longitudinal line of the support and through a position at an opposite point substantially at right angles thereto, the blade in the direction of its longitudinal axis being curved and the curving of the blade being away from its longitudinal axis from the inner end portion towards the middle portion and reversely from the middle portion towards the tip portion.

In witness whereof, I have hereunto signed my name this 5th day of April 1926.

RUDOLPH CHILLINGWORTH.